United States Patent
Mueller et al.

(10) Patent No.: US 10,279,711 B2
(45) Date of Patent: May 7, 2019

(54) LOCKING SYSTEM FOR A SEAT ARRANGEMENT OF A MOTOR VEHICLE

(71) Applicant: Brose Fahrzeugteile GmbH & Co. KG, Bamberg, Bamberg (DE)

(72) Inventors: Maximilian Mueller, Coburg (DE); Juergen Schukalski, Kueps (DE); Gregor Kroener, Bischberg (DE)

(73) Assignee: Brose Fahrzeugteile GmbH & Co. KG, Bamberg, Bamberg (DE)

( * ) Notice: Subject to any disclaimer, the term of this patent is extended or adjusted under 35 U.S.C. 154(b) by 193 days.

(21) Appl. No.: 15/259,591

(22) Filed: Sep. 8, 2016

(65) Prior Publication Data
US 2017/0066346 A1    Mar. 9, 2017

(30) Foreign Application Priority Data
Sep. 8, 2015   (DE) ........................ 10 2015 115 035

(51) Int. Cl.
*B60N 2/02*    (2006.01)
*B60N 2/30*    (2006.01)
(Continued)

(52) U.S. Cl.
CPC ......... *B60N 2/3002* (2013.01); *B60N 2/0228* (2013.01); *B60N 2/0232* (2013.01);
(Continued)

(58) Field of Classification Search
USPC ........ 297/378.12, 378.14, 61, 362.11, 361.1; 296/65.16, 65.17, 65.18
See application file for complete search history.

(56) References Cited

U.S. PATENT DOCUMENTS

| 4,969,621 A | 11/1990 | Munchow et al. |
| 6,774,505 B1 * | 8/2004 | Wnuk ............. B60N 2/0228 307/10.8 |

(Continued)

FOREIGN PATENT DOCUMENTS

| DE | 19961874 | 7/2001 |
| DE | 102005010594 A1 * | 9/2006 ............. B60N 2/002 |

(Continued)

OTHER PUBLICATIONS

Google translation of DE 102011009229A1, translated Dec. 4, 2018, 11 pages. (Year: 2018).*

(Continued)

*Primary Examiner* — Robert Canfield
(74) *Attorney, Agent, or Firm* — Pauly, DeVries Smith & Deffner LLC

(57) ABSTRACT

The present disclosure relates to a locking system for a seat arrangement of a motor vehicle, which seat arrangement has an adjustment component which is adjustable manually into at least one locking position, wherein the locking system has a locking mechanism, and wherein the adjustment component is lockable and releasable in the locking position by means of the locking mechanism, wherein the locking mechanism has an actuation drive by means of which the locking mechanism is releasable in a motorized manner, wherein the locking system has a proximity sensor which is triggerable by a predefined operator control event and wherein, by means of the triggering of the proximity sensor, the adjustment component is releasable in a motorized manner via the actuation drive.

17 Claims, 3 Drawing Sheets

(51) Int. Cl.
  *B60N 2/06* (2006.01)
  *B60N 2/22* (2006.01)
  *B60N 2/12* (2006.01)
  *B60N 2/235* (2006.01)
  *B60N 2/874* (2018.01)

(52) U.S. Cl.
  CPC ............... *B60N 2/06* (2013.01); *B60N 2/12* (2013.01); *B60N 2/2245* (2013.01); *B60N 2/2356* (2013.01); *B60N 2/3025* (2013.01); *B60N 2/874* (2018.02)

(56) References Cited

U.S. PATENT DOCUMENTS

| | | | | |
|---|---|---|---|---|
| 6,825,752 | B2* | 11/2004 | Nahata | E05B 81/78 180/273 |
| 7,154,393 | B2* | 12/2006 | Okushima | H03K 17/962 340/562 |
| 7,667,345 | B2* | 2/2010 | Budweg | B60N 2/0228 307/9.1 |
| 8,845,029 | B2* | 9/2014 | Voelz | B60N 2/22 297/362.11 |
| 8,896,417 | B2* | 11/2014 | Song | G08C 19/00 340/5.1 |
| 8,922,340 | B2* | 12/2014 | Salter | E05B 81/76 340/426.28 |
| 9,660,644 | B2* | 5/2017 | Buttolo | H03K 17/955 |
| 9,713,967 | B2* | 7/2017 | Bonk | B60N 2/0244 |
| 2002/0149376 | A1* | 10/2002 | Haffner | G01V 3/101 324/635 |
| 2003/0080601 | A1* | 5/2003 | Charras | B60N 2/206 297/378.12 |
| 2004/0104826 | A1* | 6/2004 | Philipp | G01D 5/24 341/34 |
| 2005/0052429 | A1* | 3/2005 | Philipp | G06F 3/03547 345/173 |
| 2005/0068712 | A1* | 3/2005 | Schulz | E05B 81/78 361/287 |
| 2008/0296926 | A1* | 12/2008 | Hanzel | B60R 25/2054 296/146.1 |
| 2009/0315710 | A1 | 12/2009 | Richter | |
| 2010/0170354 | A1* | 7/2010 | Haraguchi | B60N 2/0232 74/55 |
| 2010/0185341 | A1* | 7/2010 | Wilson | B60R 25/2045 701/1 |
| 2011/0238256 | A1* | 9/2011 | Heeg | B60N 2/0232 701/31.4 |
| 2012/0256461 | A1 | 10/2012 | Voelz et al. | |
| 2014/0324298 | A1* | 10/2014 | Reime | G01V 8/20 701/49 |
| 2016/0016493 | A1* | 1/2016 | Deppe | B60N 2/0232 297/378.12 |
| 2016/0280096 | A1* | 9/2016 | Bonk | B60N 2/0244 |
| 2017/0166094 | A1* | 6/2017 | Frye | B60N 2/123 |
| 2018/0065521 | A1* | 3/2018 | Vela | B60N 2/4693 |

FOREIGN PATENT DOCUMENTS

| | | | | |
|---|---|---|---|---|
| DE | 102011009229 | | 7/2012 | |
| DE | 102011018378 | | 10/2012 | |
| DE | 102013224282 | | 5/2015 | |
| EP | 3144177 | A1 * | 3/2017 | ........... B60N 2/0232 |
| GB | 2489812 | A * | 10/2012 | ........... B60N 2/0224 |
| WO | 2009033939 | | 3/2009 | |

OTHER PUBLICATIONS

European Search Report for European Patent Application No. 16182926.2, dated Feb. 16, 2017 (7 pages).
German Search and Examination Report, dated Jun. 16, 2016, Application No. 10 2015 115 035.2, 7 pages.

* cited by examiner

LOCKING SYSTEM FOR A SEAT ARRANGEMENT OF A MOTOR VEHICLE

CLAIM OF PRIORITY

This application claims the benefit of German Utility Model No. DE 10 2015 115 035.2, filed Sep. 8, 2015, the disclosure of which is incorporated by reference herein in its entirety.

FIELD OF THE TECHNOLOGY

The present document relates to a locking system for a seat arrangement of a motor vehicle, to a seat arrangement of a motor vehicle with a locking system, and to a method for operating such a seat arrangement.

BACKGROUND

Within the scope of increasing comfort in motor vehicles, the assisting of the operator in the adjustment of the seat arrangement of the motor vehicle is of particular importance. Accordingly, modern seat arrangements are equipped with a multiplicity of adjustment drives.

It is known, for example, for the seat part of a seat arrangement to be assigned a travel drive via which the seat part is correspondingly longitudinally movable (DE 10 2011 018 378 A1). Particularly convenient moving of the seat part arises in the case of the known arrangement by the fact that the longitudinal movement of the seat part can be brought about by an approach of a body part to a sensor arrangement.

With the known arrangement, high operator control convenience can be achieved by the fact that the operator is relieved from all manual adjustment activities. However, this is only the case if a reaction is made in real time to the operator's gestures. A delayed reaction of the arrangement to the approach of the body part of the operator leads in the most unfavourable situation to the operator having to wait for the motorized adjustment of the respective adjustment component to be carried out. This is unacceptable for the situation by way of example of the adjustment of a seat part, that as such can be carried out virtually without effort and in a particularly short time by the operator.

In the last-mentioned situation, the actually convenience-enhancing effect of the known arrangement becomes reversed, and therefore, as a result, even a seat arrangement which can be adjusted only manually would produce greater operator control convenience. In the case of such a manual arrangement, a locking system is provided for realizing at least two locking positions of the respective adjustment component, between which the adjustment component can be adjusted manually. Although this manual locking system which forms the starting point for the present disclosure is robust in use, in some situations it can be released only with a great amount of effort, and therefore an increase in the operator control convenience appears in turn to be possible.

SUMMARY

The present disclosure is based on the problem of designing and developing the known locking system in such a manner that the operator control convenience is increased with simple structural means.

The above problem is solved in the case of a locking system as described herein.

Firstly, the finding that neither a purely automatic adjustment of an adjustment component nor a purely manual adjustment of an adjustment component of a seat arrangement can make the greatest possible operator control convenience possible is essential. It is proposed only to carry out the release of the adjustment component automatically and to leave the manual adjustment of the adjustment component to the operator, optionally with spring assistance. The operator is therefore firstly relieved of a release which is awkward for him/her. Secondly, the operator can carry out the desired adjustment at precisely the speed which is optimum for him/her. Such a partially automated solution not only provides the greatest possible operator control convenience; it can also be realized with simple structural means.

In detail, it is first of all proposed for the seat arrangement to have an adjustment component which is adjustable manually into at least one locking position, for example a correspondingly adjustable backrest. For this purpose, the locking system is equipped with a corresponding locking mechanism, wherein the adjustment component is lockable and releasable in the locking position or in the locking positions by means of the locking mechanism.

The locking mechanism furthermore has an actuation drive by means of which the locking mechanism is releasable in a motorized manner. The motorized release can be brought about by a predefined operator control event which is detectable via a proximity sensor of the locking system. Specifically, the proximity sensor is triggered by the predefined operator control event, which brings about release of the adjustment component via the actuation drive, and therefore the adjustment component is adjustable by the operator, optionally with spring assistance.

With the solution according to the proposal, a travel drive for the motorized movement of the adjustment component can be completely dispensed with, without the operator control convenience being restricted. This already leads overall to the seat arrangement being able to be mechanically realized particularly simply.

In principle, it can be provided that the adjustment component is not only releasable, but also lockable, via the actuation drive. However, in some implementations, it is the case that the locking of the adjustment component takes place automatically within the scope of the adjustment of the adjustment component, namely by latching of the locking mechanism. The design in terms of control technology can therefore be further simplified.

Some embodiments relate to variants for the definition of the operator control event. The operator control event can be defined with differing complexity depending on the design of the proximity sensor.

In particular for the aforementioned situation in which the locking is attributed to latching of the locking mechanism, it may be necessary for the locking mechanism to fall promptly back into the locking state after the triggering of the proximity sensor. A time-based falling back of the locking mechanism can be particularly easily realized here.

A cost-effective refinement of the actuation drive is described herein, according to which the gearing connected downstream of the actuation motor is designed as a traction element gearing. The resulting transmission ratio can thereby be set within a wide range at low cost.

Some embodiments provide a seat arrangement of a motor vehicle with a locking system as described herein.

The seat arrangement according to the proposal correspondingly has an adjustment component which is adjustable manually into at least one locking position, wherein the adjustment component is lockable and releasable in the locking position or in the locking positions by means of the locking mechanism. Otherwise, reference should be made to all explanations regarding the locking system according to the proposal.

Various embodiments relate to arrangements of the proximity sensor that are particularly advantageous in respect of the operator control convenience. In principle, it is proposed to arrange the proximity sensor in or on the adjustment component itself since the operator in any case has to approach the adjustment component with a hand in order to manually adjust the adjustment component after the release. In this respect, it is particularly advantageous if the motorized release is terminated when the operator makes contact with the adjustment component.

As indicated above, the manual adjustment of the adjustment component can be provided with spring assistance. Accordingly, in various embodiments the adjustment component is assigned a corresponding spring arrangement for assisting its adjustment. Depending on the refinement of the spring arrangement, it can also be provided here that the adjustment of the adjustment component in an adjustment direction takes place in a completely spring-driven manner, while the resetting of the adjustment component and therefore the tensioning of the spring arrangement accordingly takes place manually by the operator.

Embodiments providing a method for operating a seat arrangement as described herein are also disclosed.

It is essential for the method according to the proposal that, by the triggering of the proximity sensor, the adjustment component is released in a motorized manner via the actuation drive, and therefore a manual adjustment of the adjustment component by the operator is subsequently possible. In this respect, reference should be made to all statements regarding the operation of the seat arrangement according to the proposal.

In addition to the adjustment component, a travel component which is movable in a motorized manner can be provided. It is the case here that, by the triggering of the proximity sensor, not only is the adjustment component released in a motorized manner via the actuation drive, but also the travel component is moved in a motorized manner via the travel drive. This can be used particularly advantageously in the case of what is referred to as the "easy-entry function", in which, in addition to the folding over of a backrest of a seat arrangement, at the same time a movement of the seat part of the seat arrangement forwards is also provided, and therefore the entry of the operator into the rear seat region is simplified.

Various embodiments provide a locking system for a seat arrangement of a motor vehicle, which seat arrangement has an adjustment component which is adjustable manually into at least one locking position, wherein the locking system has a locking mechanism, and wherein the adjustment component is lockable and releasable in the locking position by means of the locking mechanism, wherein the locking mechanism has an actuation drive by means of which the locking mechanism is releasable in a motorized manner, wherein the locking system has a proximity sensor which is triggerable by a predefined operator control event and wherein, by means of the triggering of the proximity sensor, the adjustment component is releasable in a motorized manner via the actuation drive.

In some cases the proximity sensor has at least one capacitive proximity sensor element.

In some cases, the locking mechanism is designed as a latching mechanism in such a manner that an adjustment of the adjustment component into the locking position is associated with latching of the locking mechanism into its locking state.

In some cases the operator control event is defined as an approach of a body part, in particular a hand, of the operator, to the proximity sensor. In some embodiments, the definition of the operator control event comprises the exceeding of a predefined approach speed.

In some cases the definition of the operator control event comprises the exceeding of a predefined residence period of the body part of the operator within the detection range of the proximity sensor.

In some cases the definition of the operator control event comprises contact of the proximity sensor or covering of the proximity sensor by a body part, in particular a hand, of the operator.

In some cases the locking mechanism in the release state automatically falls back under a fall back condition into the locking state. The fall back condition is sometimes the expiry of a predefined period of time since the triggering of the proximity sensor.

In some cases the actuation drive has an actuation motor and a gearing connected downstream of the actuation motor. In some cases the gearing is designed as a traction element gearing, in particular as a cable pull gearing. In some cases, the traction element gearing is designed in the manner of a single- or multi-stage block and tackle.

Some embodiments provide a seat arrangement of a motor vehicle with a locking system as described herein. The seat arrangement has an adjustment component which is adjustable manually into at least one locking position. The locking system has a locking mechanism, and the adjustment component is lockable and releasable in the locking position by means of the locking mechanism.

In some cases the proximity sensor is arranged in or on the adjustment component. Sometimes the proximity sensor is arranged in a handle region of the adjustment component for the manual adjustment of the latter.

In some cases the adjustment component is designed as an adjustable backrest. In some cases, the proximity sensor is arranged on an end region of the backrest. The end region faces away from the seat part of the seat arrangement.

In some cases the adjustment component is designed as a longitudinally adjustable seat part, as a depth-adjustable seat part, as a foldable headrest, as an adjustable floor lock or the like of the seat arrangement.

In some cases the adjustment component is assigned a spring arrangement for assisting its manual adjustment. In some cases the motorized release of the locking mechanism brings about a spring-driven springing open of the adjustment component at least from a locking position.

Various embodiments provide a method for operating a seat arrangement as described herein. In some cases the adjustment component is released in a motorized manner via the actuation drive by the triggering of the proximity sensor.

In some cases the seat arrangement has a travel component which is movable in a motorized manner and is assigned a travel drive. In some cases, the travel component is moved in a motorized manner via the travel drive by the triggering of the proximity sensor. In various embodiments, the adjustment component is a backrest of the seat arrangement, and the travel component is a seat part of the seat arrangement.

BRIEF DESCRIPTION OF THE FIGURES

Implementations of various systems, arrangements, and methods are explained in more detail below with reference to the drawings, in which.

DETAILED DESCRIPTION

Figure 1:
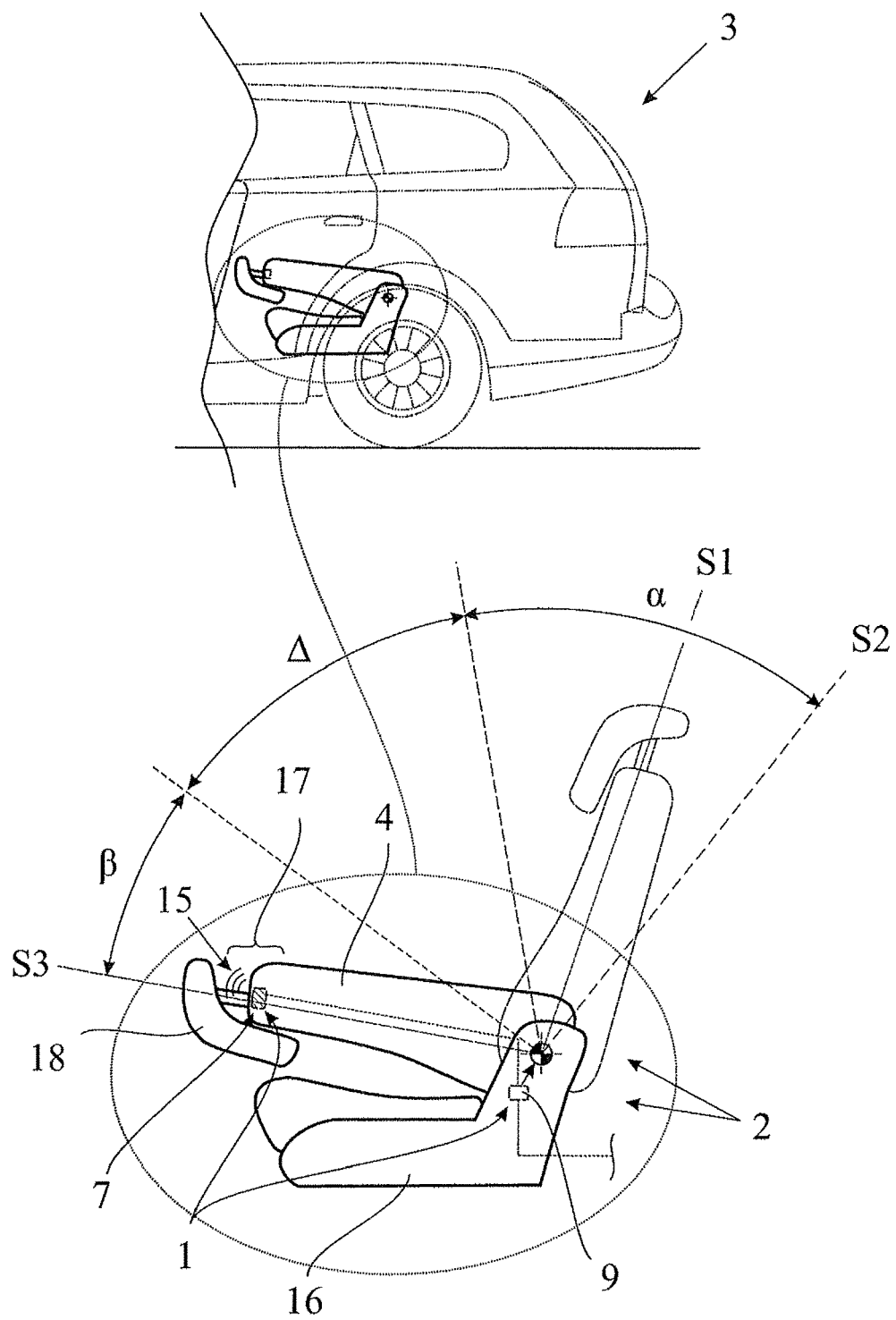
FIG. 1 shows the rear region of a motor vehicle with a seat arrangement according to the proposal, in an entirely schematic illustration.

The locking system 1 shown in the drawing is assigned to a seat arrangement 2 of a motor vehicle 3, which seat arrangement, in the embodiment which is illustrated, is part of a rear seat row. However, the seat arrangement 2 under discussion may be arranged at any location in the motor vehicle 3 and, for example, may provide a front seat of the motor vehicle 3.

The seat arrangement 2 has an adjustment component 4 which can be adjusted manually into at least one locking position, and in some embodiments between various locking positions. This can be gathered from the detailed illustration of FIG. 1. The adjustment component 4 can be any adjustable component of the seat arrangement 2. In the case of the embodiment which is illustrated, the adjustment component 4 is the backrest of the seat arrangement 2. All statements regarding the backrest of the seat arrangement 2 apply correspondingly to all other variants of the adjustment component 4.

Figure 3:
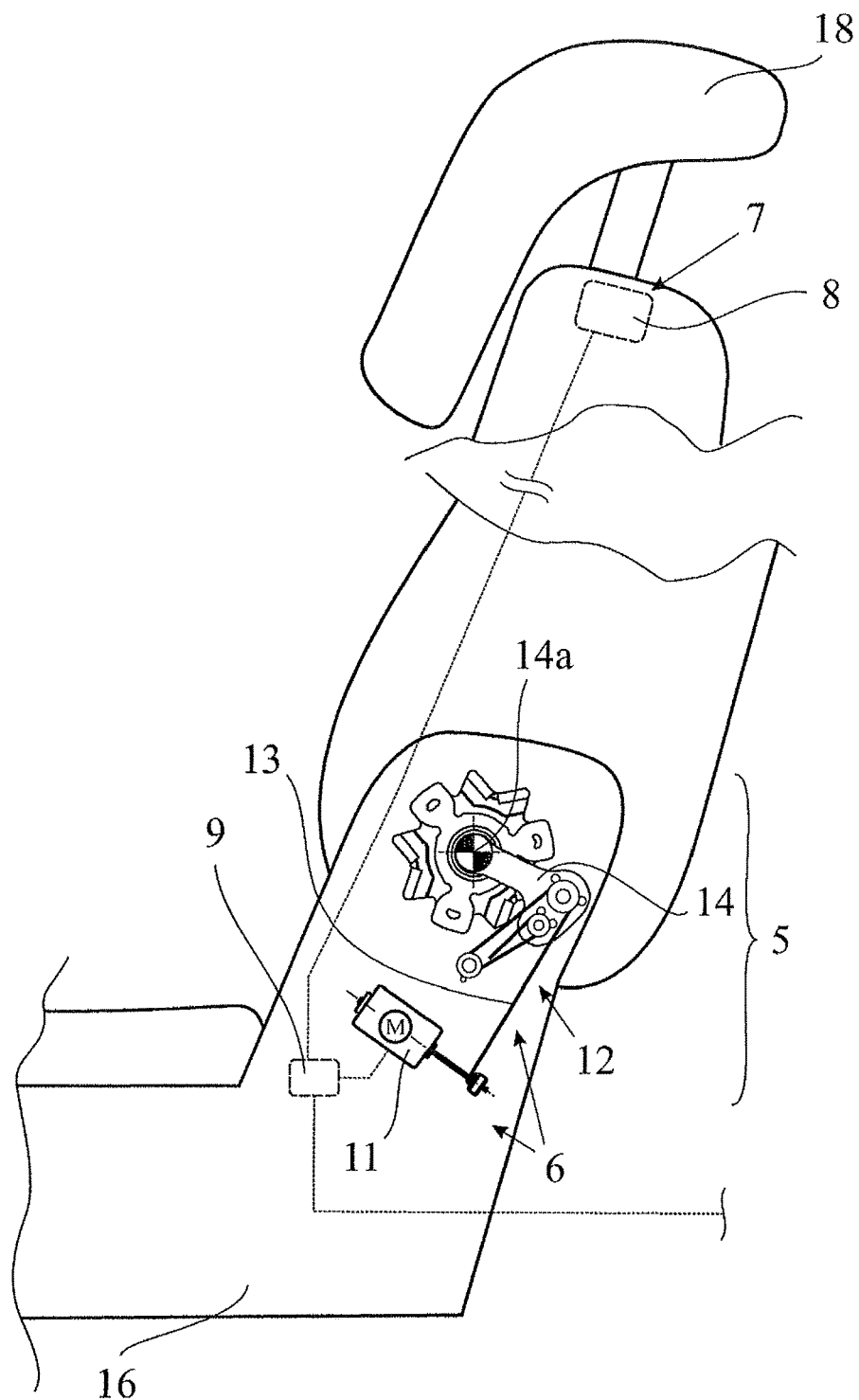
FIG. 3 shows the locking mechanism of the locking system of the seat arrangement according to FIG. 1 in an entirely schematic illustration.

The locking system 1 is equipped with a locking mechanism 5, the basic design of which can be gathered from the illustration according to FIG. 3. The function of the locking mechanism 5 consists in the adjustment component 4 being lockable and releasable in a mechanical respect in the locking positions. The locking mechanism 5 therefore ensures that the adjustment component 4 locked in a locking position remains in said locking position until the adjustment component 4 is released by means of the locking mechanism 5.

The locking mechanism 5 has an actuating drive 6 which is illustrated in FIG. 3 and by means of which the locking mechanism 5 is releasable in a motorized manner. In this connection, reference should be made to the fact that the release of the locking mechanism 5 is synonymous with the release of the adjustment component 4.

The locking system 1 has a proximity sensor 7 which is triggerable by a predefined operator control event. In the present case, the term "proximity sensor" should be understood within a wide meaning. It comprises not only at least one proximity sensor element 8 which is yet to be explained and which serves to generate sensor signals, but also an evaluation unit which may be present and in which a decision is taken about the presence of the predefined operator control event. In the present case, the triggering of the proximity sensor 7 corresponds to the state in which the predefined operator control event has been detected by the proximity sensor 7, in particular by the evaluation unit.

The adjustment component 4 is releasable in a motorized manner via the actuation drive 6 by the triggering of the proximity sensor 7. This can be provided via a direct coupling between the proximity sensor 7 and the actuation drive 6. However, in some embodiments a locking controller 9 is provided which is couplable in terms of control technology to the proximity sensor 7 on the one hand and to the adjustment drive 6 on the other hand. The locking controller 9 undertakes a corresponding activation of the actuation drive 6 upon the triggering of the proximity sensor 7.

The operation of the proximity sensor 7 can be based on entirely different sensor principles. Here, the proximity sensor 7 is a capacitive proximity sensor which has at least one capacitive proximity sensor element 8.

In principle, it can be provided that not only is the release of the adjustment component 4, but also the locking of the adjustment component 4, undertaken in a motorized manner Here, however, the locking mechanism 5 is designed as a latching mechanism in such a manner that an adjustment of the adjustment component 4 into an adjustment position is associated with latching of the locking mechanism 5 into its locking state.

In the case of the embodiment which is illustrated, the locking mechanism 5 permits locking of the adjustment component 4 in more than two locking positions. This means that there are at least two adjustment regions which each lie between two locking positions. It can be gathered from the detailed illustration of FIG. 1 that the locking mechanism 5 permits locking of the adjustment component 4 in the three locking positions $S_1$, $S_2$ and $S_3$. The locking position $S_1$ is the front most convenience locking position and the adjustment position $S_2$ is the rearmost convenience locking position, wherein the actual convenience locking position can be adapted to the operator's height. The locking position $S_3$ is finally a loading position with which an additional loading surface can generally be produced.

In some cases a particularly intuitive operator control system is produced by the fact that the operator control event is defined as an approach of a body part, here a hand 10 of the operator, to the proximity sensor 7. The approach of the hand 10 of the operator to the proximity sensor 7 is revealed from the transition from FIG. 2a to FIG. 2b. The arrangement can be undertaken in such a manner that the release is terminated before the operator's hand 10 comes into contact with the adjustment component 4, and therefore the manual adjustment of the adjustment component 4, here from the loading position of the backrest, can take place without delay. The manual adjustment of the backrest is shown in FIG. 2c.

In order to avoid erroneous triggerings of the proximity sensor 7, the definition of the operator control event can comprise the exceeding of a predefined approach speed. It is therefore ensured, for example, that an inadvertent passage through the detection range of the proximity sensor 7 with a low approach speed is not detected as an operator control event.

Alternatively or additionally, it can be provided that the definition of the operator control event comprises the exceeding of a predetermined residence period of the body part, here the hand, of the operator with the detection range of the proximity sensor 7. Further safety has been provided by the fact that an inadvertent passage through the detection range of the proximity sensor 7 is not detected as an operator control event.

Furthermore alternatively or additionally, it can be provided that the definition of the operator control event comprises contact of the proximity sensor 7 or covering of the proximity sensor 7 by a body part, here the hand, of the operator. Erroneous triggerings can therefore be substantially ruled out. However, it has to be ensured that the release of the adjustment component 4 takes place promptly in order not to obstruct the manual adjustment by the operator.

Depending on the mechanical configuration of the locking mechanism 5, it may be advantageous for the locking mechanism 5 in the release state to ultimately fall back under a fall back condition into the locking state. For example, the fall back condition can be the expiry of a predefined period of time since the triggering of the proximity sensor 7. Such a fall back of the locking mechanism 5 is advantageous in particular if the locking mechanism 5, as discussed above, is of latching design.

It can be gathered from the illustration according to FIG. 3 that the actuation drive 6 has an actuation motor 11 and a gearing 12 connected downstream of the actuation motor 11. Given an appropriate gearing transmission ratio, the actuation motor 11 can be designed to be comparatively low-powered and therefore cost-effective. A mechanically robust and at the same time cost effective configuration of the gearing is shown in the illustration according to FIG. 3. The gearing 12 here is designed as a traction element gearing with a flexible traction element 13, here in the form of a cable pull gearing. In the embodiment which is illustrated, the traction element gearing is designed in the manner of a block and tackle, here in the manner of a two-stage block and tackle. However, very generally, the block and tackle can be a single- or multi-stage block and tackle.

The flexible traction element 13 can be designed as a cable. Alternatively, however, the flexible traction element may also be designed as a band with a flat cross section or as a chain with a plurality of chain links. In particular in the case of the configuration of the traction element as a cable or band, the running noises of the actuation drive 6 with a robust mechanical design can be kept low.

The locking mechanism 5 is equipped here with a release lever 14 which is deflected about the pivot axis 14a, in the clockwise direction in FIG. 3, by means of the actuation drive 6 in order to release the adjustment component 4.

A further teaching provides the seat arrangement 2 of the motor vehicle 3 equipped with a locking system 1 according to the proposal. Reference should be made to all statements regarding the locking system 1 according to the proposal.

Figure 2:
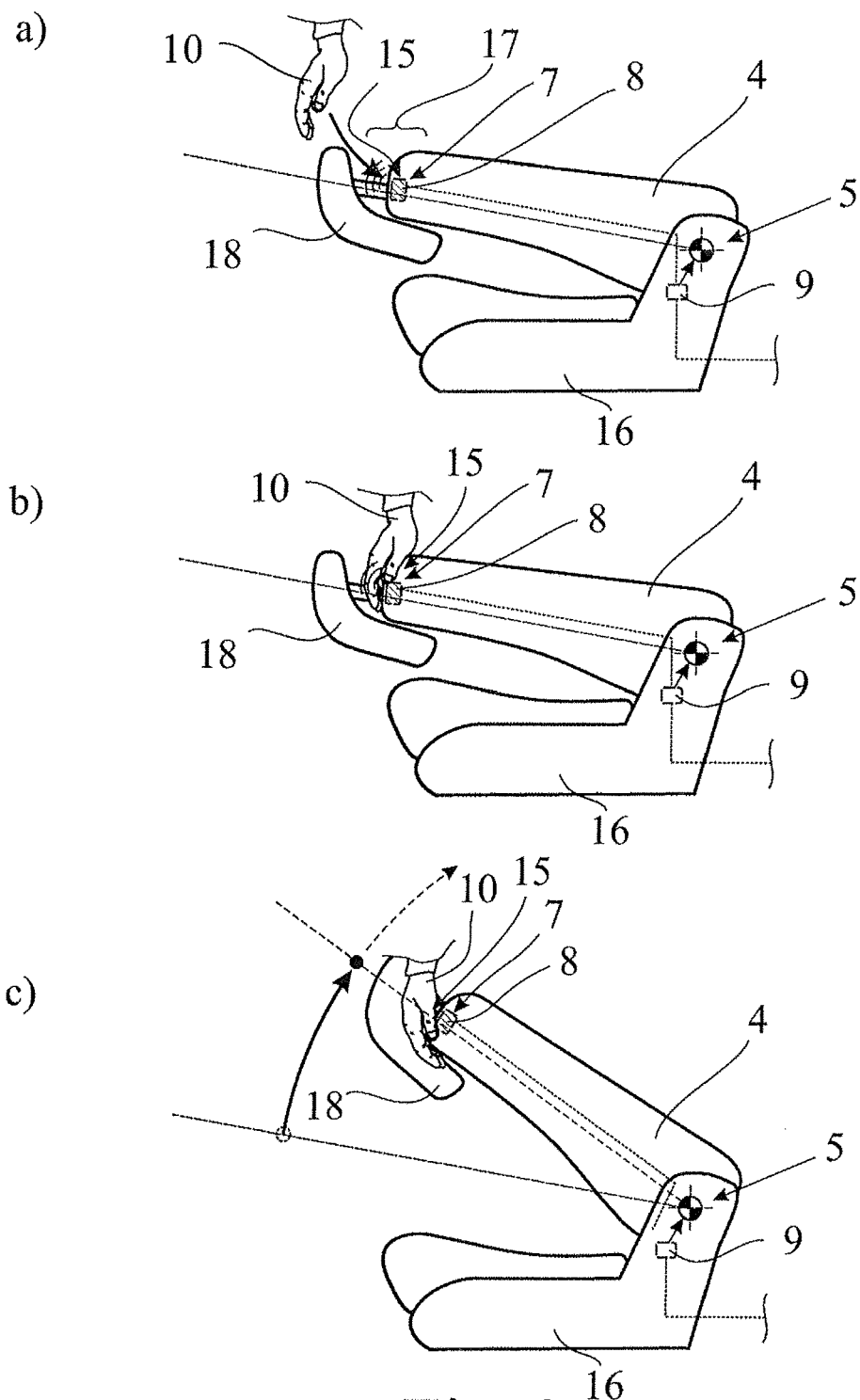
FIG. 2 shows the release of the backrest of the seat arrangement according to the proposal a) during a first phase of the operator control event, b) in a second phase of the operator control event, and c) during the manual adjustment of the backrest of the seat arrangement.

In the case of the seat arrangement 2 according to the proposal, the arrangement of the proximity sensor 7 takes on very particular importance. Here it is provided that the proximity sensor 7 is arranged in or on the adjustment component 4 itself. As shown in FIG. 2, the proximity sensor 7 can be arranged in a handle region 15 of the adjustment component 4 for the manual adjustment of the latter. It is therefore the handle region 15 which the operator would in any case intuitively grasp for the manual adjustment of the adjustment component 4. In this respect, a particularly intuitive operator control methodology is produced.

As discussed further above, the adjustment component 4 is designed here as an adjustable backrest and the proximity sensor 7 is arranged on that end region 17 of the backrest which faces away from the seat part 16 of the seat arrangement 2. This corresponds in turn to the basic concept of arranging the proximity sensor 7 at a point which the operator would in any case grasp for the manual adjustment of the adjustment component 4.

As likewise furthermore discussed above, the adjustment component 4 can be any adjustable component of a seat arrangement 2. Accordingly, the adjustment component 4 can be designed as a longitudinally adjustable seat part 16, as a depth-adjustable seat part 16, as a foldable headrest 18 or the like. It is also conceivable for the adjustment component 4 to be designed as an adjustable floor lock. Such a floor lock serves for the securing, which is releasable in a motorized manner, of the seat arrangement 2 on the floor of the motor vehicle 3. The adjustability of the floor lock permits the positioning of the seat arrangement 2 in the interior of the motor vehicle 3.

Particularly great operator control convenience can be achieved by the fact that the adjustment component 4 is assigned a spring arrangement (not illustrated) for assisting its manual adjustment. It is the case here that the release of the locking mechanism 5 in a motorized manner brings about a spring-driven springing open of the adjustment component 4 at least from a locking position.

In the case of the illustrated seat arrangement 2, the adjustment component 4, here the backrest, is freely adjustable by the spring arrangement only within the $\Delta$ adjustment range shown in FIG. 1. In order to pass from the $\Delta$ adjustment range into the locking position $S_3$, the spring arrangement has to be tensioned over the $\beta$ adjustment range. During a subsequent release, the adjustment component 4 springs open in the clockwise direction in FIG. 1, which simplifies the manual adjustment operation.

For the reaching of the locking position $S_1$ and the locking position $S_2$, the spring arrangement should be tensioned in turn over at least part of the $\alpha$ adjustment range, which in turn leads to a corresponding springing open of the adjustment component 4 when the latter is released. Other configurations of the spring arrangement are conceivable.

A further teaching provides the method described for the operation of a seat arrangement 2 according to the proposal. Here, the adjustment component 4 is released in a motorized manner via the actuation drive 6 by the triggering of the proximity sensor 7, and therefore a subsequent manual adjustment of the adjustment component 4 is possible. Reference should be made in turn to all statements regarding the operation of seat arrangement 2 according to the proposal.

In some cases the seat arrangement 2 has a travel component which is movable in a motorized manner and is assigned a travel drive (not illustrated). The travel component is moved in a motorized manner via the travel drive by the triggering of the proximity sensor 7. In some cases, the adjustment component 4 is the backrest of the seat arrangement 2 while the travel component is a seat part of the seat arrangement 2. The "easy-entry function" already discussed further above can be realized in a particularly elegant manner by the synchronized release and movement of backrest, on the one hand, and seat part, on the other hand.

The invention claimed is:

1. A locking system for a seat arrangement of a motor vehicle, which seat arrangement has a seat part and an adjustment component which is adjustable manually into at least one locking position, the locking system comprising a locking mechanism, wherein the adjustment component is lockable and releasable in the locking position by the locking mechanism, wherein the locking mechanism comprises an actuation drive, wherein the locking mechanism is releasable in a motorized manner by the actuation drive, wherein the locking system has a proximity sensor which is triggerable by a predefined operator control event, wherein the adjustment component is releasable in a motorized manner via the actuation drive by the triggering of the proximity sensor, wherein the adjustment component is designed as an adjustable backrest, and wherein the proximity sensor is arranged in or on an end region of the adjustable backrest that faces away from the seat part of the seat arrangement.

2. The locking system according to claim 1, wherein the proximity sensor has at least one capacitive proximity sensor element.

3. The locking system according to claim 1, wherein the locking mechanism is designed as a latching mechanism, wherein an adjustment of the adjustment component into the locking position is associated with latching of the locking mechanism into a locking state.

4. The locking system according to claim 1, wherein the operator control event is defined as an approach of a body part of the operator to the proximity sensor.

5. The locking system according to claim 4, wherein the definition of the operator control event comprises the exceeding of a predefined residence period of the body part of the operator within a detection range of the proximity sensor.

6. The locking system according to claim 1, wherein the definition of the operator control event comprises contact of the proximity sensor or covering of the proximity sensor by a body part of the operator.

7. The locking system according to claim 1, wherein the locking mechanism in a release state automatically falls back under a fall back condition into a locking state.

8. The locking system according to claim 1, wherein the actuation drive has an actuation motor and a gearing connected downstream of the actuation motor.

9. A seat arrangement of a motor vehicle with a locking system according to claim 1.

10. The seat arrangement according to claim 9, wherein the adjustment component is assigned a spring arrangement for assisting its manual adjustment.

11. A method for operating a seat arrangement according to claim 9, comprising triggering the proximity sensor to release the adjustment component in a motorized manner via the actuation drive.

12. The method according to claim 11, wherein the seat arrangement has a travel component which is movable in a motorized manner and is assigned a travel drive, and further comprising triggering the proximity sensor to move the travel component in a motorized manner via the travel drive.

13. The locking system according to claim 4, wherein the definition of the operator control event comprises the exceeding of a predefined approach speed.

14. The locking system according to claim 7, wherein the fall back condition is the expiry of a predefined period of time since the triggering of the proximity sensor.

15. The locking system according to claim 8, wherein the gearing is designed as a traction element gearing.

16. The seat arrangement according to claim 1, wherein the proximity sensor is arranged in a handle region of the adjustment component for the manual adjustment of the adjustment component.

17. The seat arrangement according to claim 10, wherein the motorized release of the locking mechanism brings about a spring-driven springing open of the adjustment component, at least from the locking position.

* * * * *